United States Patent

[11] 3,615,803

| [72] | Inventors | Homer L. Draper;<br>Wayne E. McLaughlin, both of Bartlesville, Calif. |
|---|---|---|
| [21] | Appl. No. | 749,282 |
| [22] | Filed | Aug. 1, 1968 |
| [45] | Patented | Oct. 26, 1971 |
| [73] | Assignee | Phillips Petroleum Company |

[54] ASPHALT-ASBESTOS PLASTIC CEMENT
2 Claims, No Drawings

[52] U.S. Cl. .................................................. 106/280,
106/282, 106/285, 260/28.5
[51] Int. Cl. .................................................. C08h 13/100,
C08h 17/22, C08i 1/46
[50] Field of Search .......................................... 106/273–285,
122; 260/28.5

[56] References Cited
UNITED STATES PATENTS

| 2,418,135 | 4/1947 | More et al. .................. | 106/273 X |
| 3,035,931 | 5/1962 | Bobbe et al. .................. | 106/280 X |
| 3,418,402 | 12/1968 | Grissom et al. ............... | 106/282 X |
| 2,909,441 | 10/1959 | Pickell ........................... | 106/282 X |
| 2,923,639 | 2/1960 | Wilkinson ...................... | 106/282 |

Primary Examiner—Julius Frome
Assistant Examiner—Joan B. Evans
Attorney—Young and Quigg ABSTRACT: An asphalt material such as an asphalt cement is combined with asbestos fibers and a solvent. There is contained in the final admixture a polymeric isobutylene in a minor amount of the order of about 0.1 to about 3 weight percent of the final mix, which upon evaporation of the solvent, is desirably cohesive and adhesive.

ASPHALT-ASBESTOS PLASTIC CEMENT

This invention relates to an improved asphalt-asbestos plastic cement or adhesive composition. It also relates to a method of preparing such a composition. Further, the invention relates to a composition containing an asphaltic material and an asbestos along with an agent which improves tackiness or adhesiveness without loss of cohesiveness of the final mix.

In one of its concepts the invention provides an admixture of an asphaltic material, as herein described, asbestos fibers, a solvent and a tackiness agent in proportions set forth. In another of its concepts the invention provides a method for preparing a desirably cohesive and adhesive asphalt-asbestos plastic cement.

For certain applications, as for plastic cement for highway department use, it is required that a certain minimum, say, approximately 25 weight percent asbestos fiber or filler be incorporated together with the asphaltic material. The incorporation of this rather large amount of mineral filler required by the specifications causes a loss in the adhesive properties of the asphalt.

We have now found that a polymeric isobutylene material known as "Paratac" having properties such as those described herein will yield the original if not improved adhesive properties possessed by the asphalt prior to admixture of said large amount of mineral filler and, surprisingly, will yield a product which upon setting or curing, i.e., evaporation of solvent, possesses desirable cohesiveness. That is so, albeit the polymeric isobutylene material is a flowable, though extremely viscous, material. "Paratac" is described in a pamphlet or bulletin published by Enjay Chemical Company. In the bulletin it is described in considerably detail. The bulletin is incorporated herein by reference.

It is an object of this invention to produce an asphalt-asbestos plastic cement. It is another object of this invention to improve the tackiness of an asbestos-containing asphaltic material in which there is used a rather large proportion of asbestos, normally resulting in loss of adhesiveness. It is a further object of this invention to prepare a composition as herein described which will possess desirable cohesiveness. In a still further object of the invention, it provides a plastic cement which is intended to be used as a mastic for sealing rather than as an adhesive or glue. It is a further object of this invention to provide such a plastic cement useful in roof applications where it is exposed to wind, rain, and sunlight.

Other aspects, concepts, and objects of the invention are apparent from a study of this disclosure and the appended claims.

According to the present invention there is provided an improved asphalt-asbestos plastic cement having desirable adhesive and cohesive properties, the composition including in addition to an asphaltic material or cement and asbestos a minor amount of a tackiness agent which is a polymeric isobutylene material. The composition is made up for application by dilution with a solvent, for example, a petroleum solvent.

It is known to admix asbestos fiber with a composition containing an asphalt. U.S. Pat. No. 1,881,436, issued Oct. 11, 1932. It is also known to employ a resin derived from a pitch having a softening point in excess of 170 obtained by the distillation of a cracked petroleum residue in an improved asphalt composition. U.S. Pat. No. 1,691,621, issued Oct. 12, 1954, Duane W. Gagle. Further, it is known to prepare an improved paving composition having resistance to deterioration by moisture by incorporation of HF acid-soluble oils and a metal compound with bitumen-aggregate paving compositions. U.S. Pat. No. 2,775,530 issued Dec. 25, 1956, Duane W. Gagle and Charles E. Defabaugh. A bituminous adhesive is described in U.S. Pat. No. 2,418,135, issued Apr. 1, 1947. The adhesive or cement is said to be suitable for fibrous products.

The present invention is applicable with particularly interesting results to the preparation of a plastic cement designed to meet specifications which require a minimum of 25 weight percent short asbestos fiber. A composition which has been prepared and used with entirely satisfactory results is as follows:

|  | Weight Percent |
|---|---|
| Refined petroleum asphalt with penetration at 77° F. of 30–70 | 38 Minimum |
| Short Fiber Asbestos | 25 Minimum |
| Petroleum Solvent | 25 Maximum |

The petroleum solvent used in the foregoing composition is kerosene. Other solvents can be used as herein described and as one skilled in the art in possession of this disclosure having studied the same will understand.

To more fully appreciate the several concepts underlying the invention, the following information is given.

Asphalt Materials

The asphalt materials now preferred which can be used are known as asphalt cements. These asphalt cements are conventionally prepared by distilling a crude oil to produce topped crude. The topped crude is further reduced, for example, by vacuum distillation to produce an asphalt cement. Asphalt cements now preferred which can be used are those whose penetrations (100 g. total weight, 15 seconds, at 77° F.) range from about 20 to about 100, more preferably about 30 to about 70 penetration. The particular asphalt cement chosen will depend upon the final product properties desired.

Petroleum Solvent

Among the petroleum solvents which can be used are hydrocarbon distillates, preferably of relatively high flash point. Such fractions are derived from processing of hydrocarbon crude oils and can comprise high-flash naphthas, kerosene, heating distillates, cycle oils and virgin gas oils. The initial boiling point is generally above about 200° F. to avoid a too low flash point. A particularly useful solvent is known as "Stoddard Solvent." This solvent is well known. However, mixtures of various solvents can be used, depending upon the final product being produced by the invention.

Asbestos Fibers

Various commercially available asbestos fibers can be used. The fibers can have lengths ranging from about 1 inch to about "powder" properties: size, preferably about 0.251 to about 0.01-inch length. The diameters of the fibers can be of any size available. The smaller fibers give spreading ease, which is needed when a plastic, spreadable, mix is produced.

Tackiness Agents

A particular useful tackiness agent is known as "Paratac." This material is a polymeric isobutylene material having the following, approximate properties:

| | |
|---|---|
| Specific Gravity at 60° F./60° F. | 0.89 |
| Pour Point, ° F. | 10 |
| Flash Point, ° F. | 355 |
| Saybolt Furol Vis at 210° F., sec., | 1,350 |

This material is used in an amount to impart adhesive properties so that the asbestos-asphalt cement product will properly form a uniform blend, the asphalt properly adhering to the fibers and the final mass properly adhering to the material to which it is applied. The upper limit of the proportion of tackiness agent used is reached when the tackiness agent fails to produce the desired cohesive properties. The tackiness agent is a very viscous liquid material and ordinarily should not be used in an amount sufficient to destroy substantially the desired cohesiveness.

Ranges of Materials

Usually the tackiness agent is used in the range of about 0.1 to about 3 weight percent of the blend of product. The routineer can test his blend to determine the amount of tackiness agent he needs for a particular application. This application may not be desired to have maximum tackiness, or it may be desired to have the maximum tackiness, depending upon the desired use of the product produced. However, usually 0.1 1 weight percent tackiness agent will be found to be a desirable range and to give the desired cohesiveness.

The major components will normally have the following ranges:

|  | Weight Percent | Weight Percent |
|---|---|---|
|  | Broad | Preferred |
| Asphalt Cement | 25–75 | 30–70 |
| Asbestos Fibers | 15–65 | 20–60 |
| Hydrocarbon Solvent | 10–50 | 10–50 |

Specific Example—Weight Percents (I)

| Asphalt Cement (65 penetration) | 50.5 |
|---|---|
| Asbestos Fibers (0.01 to 0.25 inch) | 27.0 |
| Stoddard Solvent | 22.0 |
| Tackiness Agent "Paratac" | 0.5 |
| Total | 100.0 |

(II)

| Asphalt Cement (65 penetration) | 50.5 |
|---|---|
| Asbestos Fibers (0.25 to 1.0 inch) | 27.0 |
| Stoddard Solvent | 22.0 |
| Tackiness Agent "Paratac" | 0.5 |
| Total | 100.0 |

(III)

| Asphalt Cement (35 penetration) | 30.6 |
|---|---|
| Asbestos Fibers (0.01 to 0.25 inch) | 24.0 |
| Kerosene/Stoddard Solvent (50/50) | 45.0 |
| Tackiness Agent "Paratac" | 0.4 |
| Total | 100.0 |

(IV)

| Asphalt Cement (95 penetration) | 64.9 |
|---|---|
| Asbestos Fibers (0.01 to 0.25 inch) | 20.0 |
| Kerosene | 15.0 |
| Tackiness Agent "Paratac" | 0.1 |
| Total | 100.0 |

(V)

| Asphalt Cement (50 penetration) | 26.2 |
|---|---|
| Asbestos Fibers (0.01 to 0.25 inch) | 60.0 |
| Light Cycle Oil | 12.0 |
| Tackiness Agent "Paratac" | 1.8 |
| Total | 100.0 |

Example I makes a very smooth, easily applied mastic. The product, after application, loses its Stoddard Solvent and becomes an excellent adhesive-cohesive mass in use.

Example II, with longer fibers of asbestos, does not apply as smoothly, but produces a workable mass which cures (solvent evaporates) as desired with excellent adhesive properties, nonflowing after cure.

Example III, with high solvent, flows very easily to spread on a flat or low-sloping e.g., roof) surface. The kerosene slows down "curing" or evaporation of the applied mass. (Less "-Paratac" is needed in material with a lower load of asbestos). The final produce is excellent, possessing desirable tackiness as well as cohesiveness.

Example IV, low-solvent, high-penetration asphalt cement, spreads fairly well (works harder than higher solvent materials), but produces fine final product.

Example V is high-loaded asbestos (requiring high-tackiness agent). This produce applies properly, has slow cure (due to light cycle oil solvent), and adheres as desired. It possesses desirable cohesiveness.

Various aggregates can be blended with these compositions for specialty uses. Such aggregates include fine sand, pumice, catalyst fines (from fluid catalytic cracking), and the like. The percentages of aggregate blended depend upon final usage of the product and can be determined by routine testing. Normally, up to about 50 weight percent aggregate can be used.

Reasonable variation and modification are possible within the scope of the foregoing disclosure and the appended claims to the invention the essence of which is that there has been provided a composition containing an asphalt cement, asbestos fiber and a tackifier consisting essentially of a polymeric isobutylene.

We claim:

1. An improved asphalt-asbestos containing plastic cement suitable for easy and smooth spreading consisting essentially of an asphalt cement, asbestos fiber, a liquid-viscous tacky isobutylene polymer tackifier material having the following approximate properties, Specific Gravity at F./60° F. 0.89, Pour Point, 10° F., Flash Point, 355° F., Saybolt Furol Viscosity at 210° F., 1,350 sec.; in an amount sufficient to restore the adhesiveness of the asphalt cement which it possesses prior to addition of the asbestos fiber but in an amount insufficient to destroy cohesiveness of the final blend, and a solvent selected from distillates derived from processing of hydrocarbon crude oils and which are flash naphthas, kerosene, heating distillates, cycle oils and virgin gas oils, having an initial boiling point of about 200° F. in an amount to render the composition sufficiently fluid to be applied for its intended use, wherein the asphalt cement has a penetration of 100 grams total weight, 5 seconds, at 77° F., in the approximate range of from about 30 to about 70, and is present in the approximate range of from about 30 to about 70 percent weight, the asbestos fibers are short fibers and have lengths ranging from approximately 0.01 up to approximately 0.25 inches and are present in an amount in the range of from about 20 to about 60 weight percent, the tacky isobutylene tackifier is present in an amount in the range from about 0.4 to about 1.8 percent, and the hydrocarbon solvent is present in an amount in the range of from about 12 to about 60 percent weight.

2. A cement composition according to claim 1 wherein the asphalt cement is a refined petroleum asphalt cement with penetration at 77° F., as herein defined, in the range of from about 30 to about 70, and is present in an amount of at least 38 weight percent; the asbestos fibers are present in at least an amount of 25 weight percent, and the remainder of the composition is solvent.

* * * * *

UNITED STATES PATENT OFFICE

CERTIFICATE OF CORRECTION

Patent No. 3,615,803                      Dated: October 26, 1971

It is certified that error appears in the above-identified patent and that said Letters Patent are hereby corrected as shown below:

Residence of inventors shown as Bartlesville, California. Should be changed to Bartlesville, Oklahoma.

Signed and sealed this 11th day of April 1972.

(SEAL)
Attest:

EDWARD M. FLETCHER, JR.          ROBERT GOTTSCHALK
Attesting Officer                 Commissioner of Patents